United States Patent
Korzunov

(10) Patent No.: US 10,192,324 B2
(45) Date of Patent: Jan. 29, 2019

(54) METHOD AND ELECTRONIC DEVICE FOR DETERMINING WHETHER A POINT LIES WITHIN A POLYGON IN A MULTIDIMENSIONAL SPACE

(71) Applicant: YANDEX EUROPE AG, Lucerne (CH)

(72) Inventor: Anton Vasilyevich Korzunov, Moscow region (RU)

(73) Assignee: YANDEX EUROPE AG, Lucerne (CH)

( * ) Notice: Subject to any disclaimer, the term of this patent is extended or adjusted under 35 U.S.C. 154(b) by 6 days.

(21) Appl. No.: 15/521,128

(22) PCT Filed: Feb. 9, 2015

(86) PCT No.: PCT/IB2015/050970
§ 371 (c)(1),
(2) Date: Apr. 21, 2017

(87) PCT Pub. No.: WO2016/067116
PCT Pub. Date: May 6, 2016

(65) Prior Publication Data
US 2017/0323457 A1    Nov. 9, 2017

(30) Foreign Application Priority Data

Oct. 30, 2014  (RU) .................................. 2014143789

(51) Int. Cl.
*G06T 7/11* (2017.01)
*G06T 7/60* (2017.01)
(Continued)

(52) U.S. Cl.
CPC ................ *G06T 7/73* (2017.01); *G06F 17/10* (2013.01); *G06T 7/11* (2017.01); *G06T 7/60* (2013.01);
(Continued)

(58) Field of Classification Search
CPC ......... G06T 11/20; G06T 11/40; G06T 17/05; G06T 11/203; G06T 15/06;
(Continued)

(56) References Cited

U.S. PATENT DOCUMENTS 4,897,805 A    1/1990 Wang
5,303,340 A    4/1994 Gonzalez-Lopez et al.
(Continued)

FOREIGN PATENT DOCUMENTS

RU    2342705 C1    12/2008

OTHER PUBLICATIONS

International Search Report with regard to PCT/IB2015/050970 dated Jun. 17, 2015.
(Continued)

*Primary Examiner* — Haixia Du
(74) *Attorney, Agent, or Firm* — BCF LLP

(57) ABSTRACT

A computer-implemented method for determining whether a point lies within a first polygon in a multidimensional space and an electronic device for carrying out the method is disclosed. The method comprises accessing first polygon coordinates defining each of a position and a shape of the first polygon in the multidimensional space; accessing the point coordinates defining the position of the point in the multidimensional space; identifying regions of the multidimensional space each encompassing a respective portion of the first polygon coordinates, the regions approximating the first polygon; and storing, in a non-transitory computer-readable medium, region coordinates of at least one of the regions; whereby an analysis of the region coordinates and point coordinates is executable to generate an indication that the point lies within the first polygon and an indication that (Continued)

the point does not lie within the first polygon. Some implementations comprise executing the analysis and providing the indication.

14 Claims, 10 Drawing Sheets

(51) Int. Cl.
*G06T 7/73* (2017.01)
*G06F 17/10* (2006.01)
*G06T 11/20* (2006.01)

(52) U.S. Cl.
CPC ........ *G06T 11/203* (2013.01); *G06T 2210/21* (2013.01)

(58) Field of Classification Search
CPC ......... G06T 2210/21; G06T 7/11; G06T 7/13; G06T 7/60; G06T 7/73; G06F 17/30241; G06F 17/30061; G01C 21/26
See application file for complete search history.

(56) References Cited

U.S. PATENT DOCUMENTS

| | | |
|---|---|---|
| 5,751,289 A | 5/1998 | Myers |
| 6,996,793 B1 | 2/2006 | Kronmiller et al. |
| 7,072,764 B2 | 7/2006 | Donath et al. |
| 7,567,248 B1 | 7/2009 | Mark et al. |
| 8,416,122 B1 | 4/2013 | Pedersen |
| 8,508,533 B2 | 8/2013 | Cervelli et al. |
| 2003/0007673 A1 | 1/2003 | Truyen et al. |
| 2006/0227134 A1 | 10/2006 | Khan et al. |
| 2008/0143709 A1 | 6/2008 | Fassero et al. |
| 2008/0266287 A1 | 10/2008 | Ramey et al. |
| 2009/0307248 A1 | 12/2009 | Moser et al. |
| 2011/0065416 A1 | 3/2011 | Burt et al. |
| 2013/0100134 A1 | 4/2013 | Cervelli et al. |
| 2013/0100502 A1 | 4/2013 | Takahashi et al. |
| 2013/0278594 A1 | 10/2013 | Kaatz et al. |
| 2016/0062587 A1* | 3/2016 | Muller ................ G06F 3/04842 715/769 |

OTHER PUBLICATIONS

Tukachev, "Algorithm of Point Recognition of General Polygon or Triangular Face Polygon", ISSN 0136-5835, VESTNIK, 2009, vol. 15, No. 3, pp. 638-652.

"Polygon Operations in ActionScript", vis4.net, retrieved on Internet on Jul. 22, 2014.

Li, "Suitability of Topological Data Structures for Data Parallel Operations in Computer Cartography", University of Miami, pp. 434-443.

"JTS Topology Suite—Features", retrieved on Internet on Jul. 22, 2014.

"Polyline Decimation (any Dim)", retrieved on Internet on Jul. 22, 2014.

De Koning, "Polyline Simplification", retrieved on Internet on Jul. 22, 2014.

* cited by examiner

METHOD AND ELECTRONIC DEVICE FOR DETERMINING WHETHER A POINT LIES WITHIN A POLYGON IN A MULTIDIMENSIONAL SPACE

CROSS-REFERENCE

The present application claims priority to Russian Patent Application No. 2014143789, filed Oct. 30, 2014, entitled "METHOD AND ELECTRONIC DEVICE FOR DETERMINING WHETHER A POINT LIES WITHIN A POLYGON IN A MULTIDIMENSIONAL SPACE" the entirety of which is incorporated herein.

FIELD

The present technology relates to systems and methods for determining whether a point lies within a polygon in a multidimensional space.

BACKGROUND

In many computer applications, first data may be represented by a polygon traversing two or more dimensions of a multidimensional space, second data may be represented by a point in the same multidimensional space. The polygon may comprise a chain of segments which may represent a closed curve. Some computer applications may require determining whether the point representative of the second data lies within the polygon representative of the first data. Determining whether the point representative of the second data lies within the polygon representative of the first data finds applications in many areas including, but not limited to, dealing with the processing of geometrical data such as computer graphics, computer vision, geographical information systems (GIS), navigation systems, motion planning and/or Computer-Aided Design (CAD).

Even though a certain number of methods were developed to determine whether a point lies within a polygon, a need remains for improvements, in particular improvements aiming at using less processor resources.

SUMMARY

In some applications, it is useful to approximate a relatively complex polygon representing a closed curve by regions approximating the relatively complex polygon. For example, such complex polygon approximation may be effected with the goal of reducing the data required to describe the complex polygon while nonetheless maintaining a sufficient description of the complex polygon to subsequently determine whether a point lies within the complex polygon.

The present technology arises from an observation made by the inventor(s) that information obtained while generating regions which approximate a complex polygon can subsequently be used to efficiently determine whether a point lies within the complex polygon. More specifically, some algorithms for generating regions approximating a first polygon may involve explicitly or implicitly identifying regions encompassing portions of the first polygon to further improve a level of accuracy of the regions approximating the first polygon, such that, a point determined to lie inside an area bounded by the regions may be deemed to lie within the first polygon and/or that a point determined to lie outside the area bounded by the regions may be deemed not to lie within the first polygon. While, in some instances, information defining a first set of regions is conventionally considered merely incidental in the process of generating a second set of regions more accurately approximating the first polygon and therefore discarded after generation of the second set of regions, the present technology may preserve this information for the novel purpose of efficiently analyzing whether a point lies within the first polygon.

Thus, in one aspect, various implementations of the present technology provide a computer-implemented method and electronic device for determining whether a point lies within a first polygon in a multidimensional space, the method executable by a processor of a device, the method comprising:
  accessing first polygon coordinates defining each of a position and a shape of the first polygon in the multidimensional space;
  accessing the point coordinates defining the position of the point in the multidimensional space;
  identifying regions of the multidimensional space each encompassing a respective portion of the first polygon coordinates, the regions approximating the first polygon; and
  storing, in a non-transitory computer-readable medium, region coordinates of at least one of the regions;
whereby an analysis of the region coordinates and point coordinates is executable to determine a number of times a ray projecting from the point towards any direction intersects any of the plurality of regions and to generate, based on the number of times the ray projecting from the point towards any direction intersects any of the plurality of regions, one of an indication that the point lies within the first polygon and an indication that the point does not lie within the first polygon.

In some implementations, executing the analysis of the point coordinates and the region coordinates comprises executing a Ray Casting algorithm.

In some further implementations, identifying the regions of the multidimensional space each encompassing a respective portion of the first polygon comprises generating a second polygon approximating the first polygon; identifying a first set of the regions while generating a first version of the second polygon, the first version of the second polygon being a first polygonal chain; and identifying a second set of the regions while generating a second version of the second polygon, the second version of the second polygon being a second polygonal chain having more line segments than the first polygonal chain.

In some implementations, identifying the first set of the regions comprises determining that at least one member of the first set of the regions has a boundary distance greater than a threshold value; and identifying the second set of the regions comprises determining that no member of the second set of the regions has a boundary distance greater than the threshold value.

In some further implementations, identifying the regions approximating the first polygon comprises executing a Ramer-Douglas-Peucker algorithm.

In another aspect, various implementations of the present technology provide a computer-implemented method for determining whether a point lies within a first polygon in a multidimensional space, the method executable by a processor of a device, the method comprising:
  reading, from a non-transitory computer-readable medium, region coordinates of at least one of a plurality of regions of the multidimensional space each encompassing a respective portion of the first polygon, the regions approximating the first polygon;

accessing point coordinates defining a position of the point in the multidimensional space;

executing an analysis of the region coordinates and the point coordinates to determine a number of times a ray projecting from the point towards any direction intersects the plurality of regions; and generating, based on the number of times the ray projecting from the point towards any direction intersects any of the plurality of regions, one of an indication that the point lies within the first polygon and an indication that the point does not lie within the first polygon.

In some implementations of any one of the above-recited aspects, the method further comprises generating the indication that the point lies within the first polygon if the number of times the ray projecting from the point towards any direction intersects any of the plurality of regions is an odd number.

In some implementations of any one of the above-recited aspects, the method further comprises generating the indication that the point does not lie within the first polygon if the number of times the ray projecting from the point towards any direction intersects any of the plurality of regions is an even number.

In some implementations of any one of the above-recited aspects, each one of the regions consists of all points no further than a boundary distance from a line approximating the respective portion of the first polygon of the one of the regions, the boundary distance being a shortest distance from the line to a point most distant from the line on the respective portion of the first polygon.

In some implementations, the multidimensional space has only two dimensions, and each one of the regions is a respective area of the multidimensional space.

In some implementations, the multidimensional space has only two dimensions, and each one of the regions is a respective area of the multidimensional space consisting of all points no further than a first boundary distance away from a first side of a line approximating the respective portion of the first polygon of the one of the regions, the first boundary distance being a shortest distance away from the first side of the line to a point most distant from the first side of the line on the respective portion of the first polygon; and all points no further than a second boundary distance away from a second side of the line, the second boundary distance being a shortest distance away from the second side of the line to a point most distant from the second side of the line on the respective portion of the first polygon.

In another aspect, various implementations of the present technology provide a computer-implemented method for determining whether a point lies within a first polygon in a multidimensional space, the method executable by a processor of a device, the method comprises:

accessing first polygon coordinates defining each of a position and a shape of the first polygon in the multidimensional space;

accessing the point coordinates defining the position of the point in the multidimensional space;

identifying regions of the multidimensional space each encompassing a respective portion of the first polygon coordinates, the regions approximating the first polygon; and storing, in a non-transitory computer-readable medium, region coordinates of at least one of the regions;

whereby an analysis of the region coordinates and point coordinates is executable to generate an indication that the point lies within the first polygon and an indication that the point does not lie within the first polygon.

In some further implementations, identifying the regions of the multidimensional space each encompassing a respective portion of the first polygon approximating the first polygon comprises generating a second polygon approximating the first polygon; identifying a first set of the regions while generating a first version of the second polygon, the first version of the second polygon being a first polygonal chain; and identifying a second set of the regions while generating a second version of the second polygon, the second version of the second polygon being a second polygonal chain having more line segments than the first polygonal chain.

In some implementations, the method comprises identifying the first set of the regions comprises determining that at least one member of the first set of the regions has a boundary distance greater than a threshold value; and identifying the second set of the regions comprises determining that no member of the second set of the regions has a boundary distance greater than the threshold value.

In another aspect, the method further comprises executing the analysis of the region coordinates and the point coordinates; and generating, one of an indication that the point lies within the first polygon and an indication that the point does not lie within the first polygon based on the analysis of the region coordinates and point coordinates.

In another aspect, various implementations of the present technology provide a computer-implemented method for determining whether a point lies within a first polygon in a multidimensional space the method executable by a processor of a device, the method comprising:

reading, from a non-transitory computer-readable medium, region coordinates of at least one of a plurality of regions of the multidimensional space each encompassing a respective portion of the first polygon, the regions approximating the first polygon;

accessing point coordinates defining a position of the point in the multidimensional space;

executing an analysis of the region coordinates and the point coordinates; and generating one of an indication that the point lies within the first polygon and an indication that the point does not lie within the first polygon based on the analysis of the point coordinates and the region coordinates.

In some implementations of any one of the above-recited aspects, generating the one of the indication that the point lies within the first polygon and the indication that the point does not lie within the first polygon based on the analysis of the point coordinates and the region coordinates is after determining a number of times a ray projecting from the point towards any direction intersects any of the plurality of regions.

In some implementations, the method further comprises generating the indication that the point lies within the first polygon after determining that the number of times the ray projecting from the point towards any direction intersects any of the plurality of regions is an odd number.

In some implementations, the method further comprises generating the indication that the point does not lie within the first polygon after determining that the number of times the ray projecting from the point towards any direction intersects any of the plurality of regions is an even number.

In some implementations of any one of the above-recited aspects each one of the regions consists of all points no further than a boundary distance from a line approximating the respective portion of the first polygon of the one of the regions, the boundary distance being a shortest distance from the line to a point most distant from the line on the respective portion of the first polygon.

In some implementations, the multidimensional space has only two dimensions, and each one of the regions is a respective area of the multidimensional space.

In some implementations of any one of the above-recited aspects the multidimensional space has only two dimensions, and each one of the regions is a respective area of the multidimensional space consisting of all points no further than a first boundary distance away from a first side of a line approximating the respective portion of the first polygon of the one of the regions, the first boundary distance being a shortest distance away from the first side of the line to a point most distant from the first side of the line on the respective portion of the first polygon; and all points no further than a second boundary distance away from a second side of the line, the second boundary distance being a shortest distance away from the second side of the line to a point most distant from the second side of the line on the respective portion of the first polygon.

In other aspects, various implementations of the present technology provide a non-transitory computer-readable medium storing program instructions for determining whether a point lies within a first polygon in a multidimensional space, the program instructions being executable by a processor of an electronic device to carry out one or more of the above-recited methods.

In other aspects, various implementations of the present technology provide an electronic device comprising at least one processor and a memory storing program instructions for determining whether a point lies within a first polygon in a multidimensional space, the program instructions being executable by one or more processors of an electronic device to carry out one or more of the above-recited methods.

In the context of the present specification, unless expressly provided otherwise, an "electronic device" is any hardware and/or software appropriate to the relevant task at hand. Thus, some non-limiting examples of electronic devices include computers (servers, desktops, laptops, netbooks, etc.), smartphones, and tablets, as well as network equipment such as routers, switches, and gateways.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
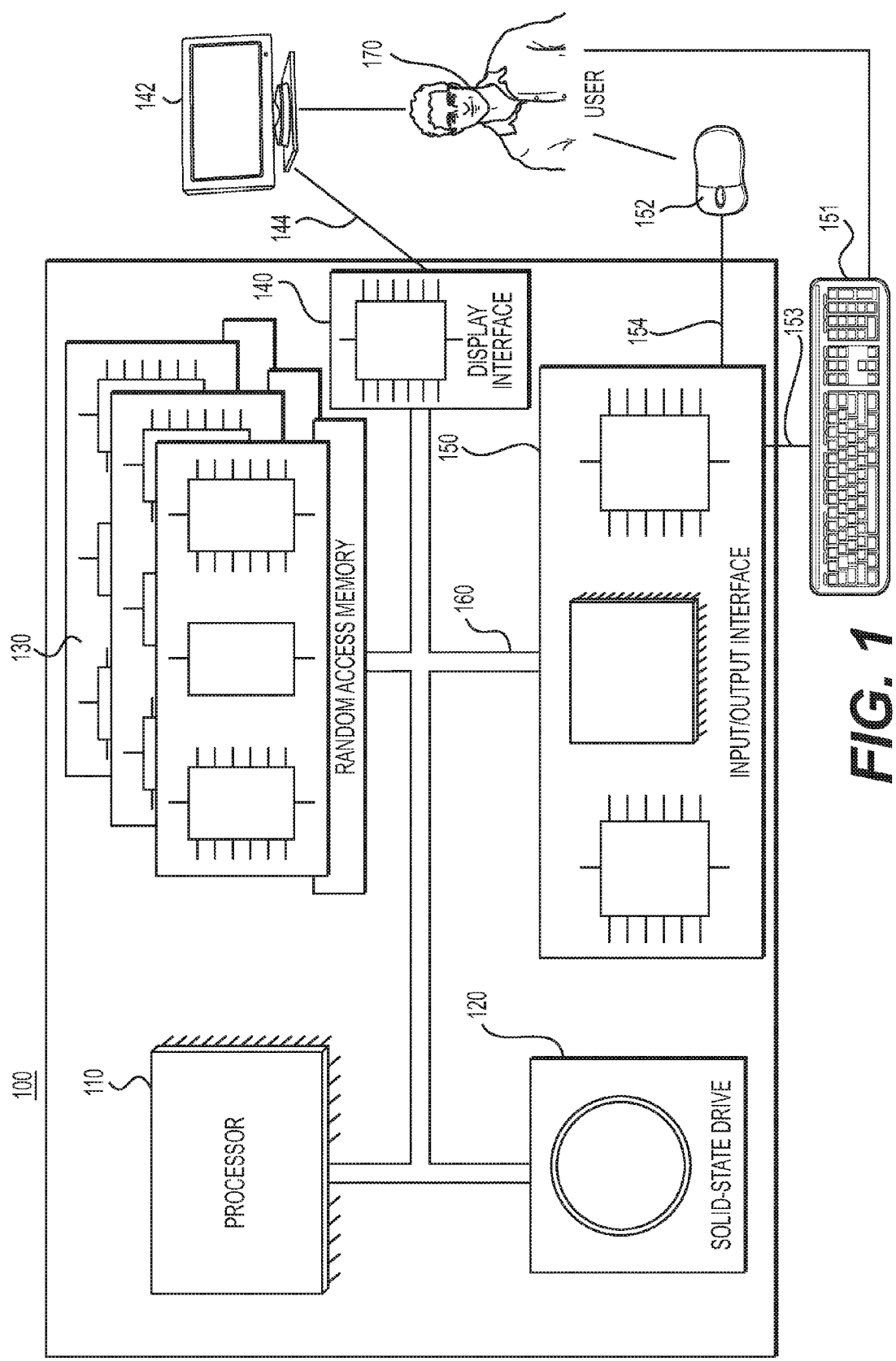
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 for determining whether a point lies within a polygon in a multidimensional space. For example, the program instructions may be part of a library or an application.

Figure 2:
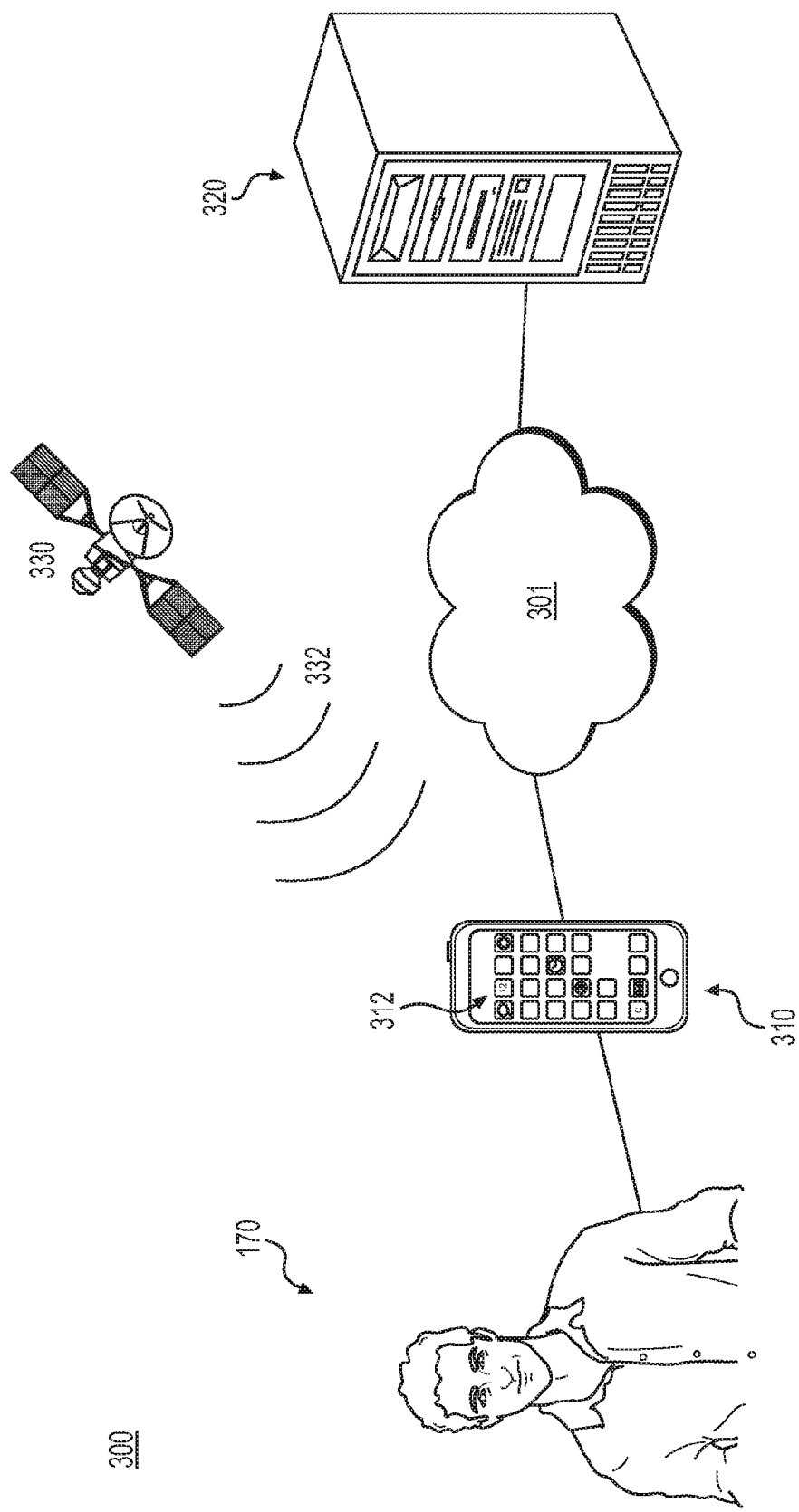
FIG. 2 is a diagram of a networked computing environment suitable for use with some implementations of the present technology.

In FIG. 2, there is shown a networked computing environment 300 suitable for use with some implementations of the present technology, the networked computing environment 300 comprising a smartphone 310 (e.g. an Apple iPhone™ or a Samsung Galaxy S4™) with a touch screen display 312 for displaying information to user 170 and receiving touch screen commands from user 170, a mapping server 320 in communication with smartphone 310 via a communications network 301 (e.g. the Internet), and a GPS satellite 330 transmitting a GPS signal 332 to smartphone 310.

Along with touchscreen display 312, smartphone 310 also comprises internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the mapping server 320 via communications network 301 and a GPS receiver (not depicted) for receiving the GPS signal 332 from GPS satellite 330.

Figure 3:
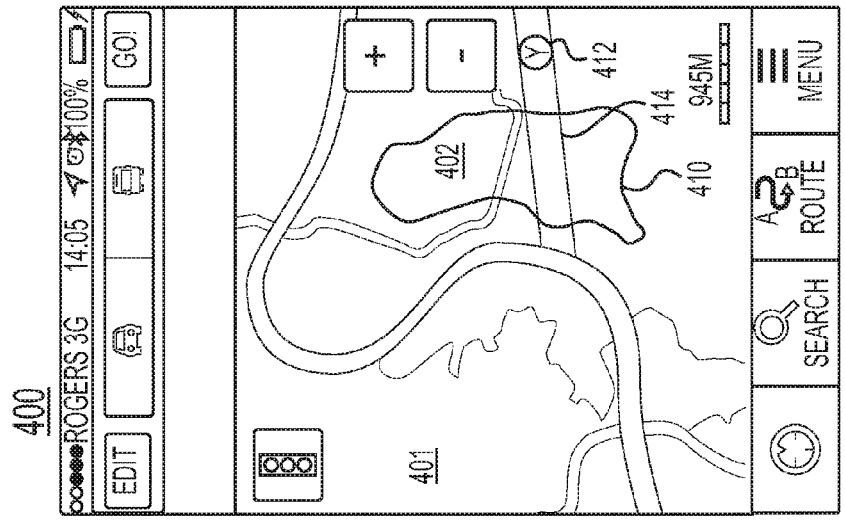
FIGS. 3 to 5 are screenshots of a mapping application illustrating an implementation of the present technology.

FIG. 3 shows a mapping application 400 running on processor 110 of the smartphone 310 of FIG. 2, as possibly displayed on its touchscreen display 312. The mapping application 400 displays a map 401 comprising an area 402 bounded by a polygon 410 representing a closed curve which defines the boundaries of the area 402. For example, program instructions of the mapping application 400, when executed by processor 110 of smartphone 310, may have caused the processor 110 to obtain a request, from user 170 via the touch screen display 312, to determine a location of the smartphone 310 and to determine whether the location of the smartphone 310 is within the area 402. As a result, processor 110 may have directed the network interface of smartphone 310 to obtain suitable mapping information from mapping server 320 via the communications network 301 of FIG. 2.

Figure 4:
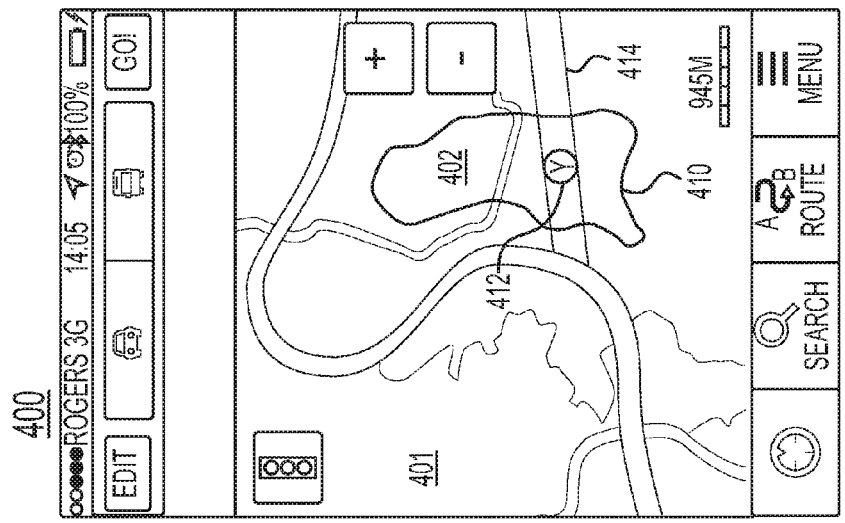
Figure 5:
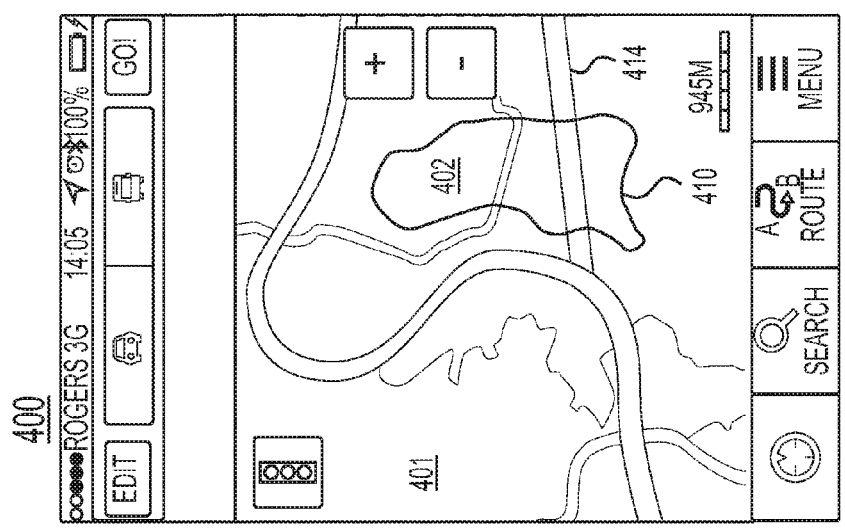

As depicted in FIG. 4 and FIG. 5, in order to determine a GPS position 412 of the smartphone 310, the program instructions of mapping application 400 may further cause the processor 110 to direct the GPS receiver of smartphone 310 to obtain the GPS position 412 of smartphone 310 by decoding the GPS signal 332 received from GPS satellite 330 of FIG. 2. For example, user 170 may be travelling along road 414 while carrying smartphone 310. Each of FIG. 4 and FIG. 5 represents a potential screenshot of the mapping application 400 as it may appear on the touch screen display 312 of smartphone 310, depending on whether the mapping application 400 has determined that the GPS position 412 of smartphone 310 is or is not within the area 402.

More specifically, FIG. 4 shows how map 401 may appear on touch screen display 312 if mapping application 400 has determined that a point representative of GPS position 412 lies within the area 402.

FIG. 5 shows how map 401 may appear on touch screen display 312 of smartphone 310 if mapping application 400 has determined that GPS position 412 does not lie within the area 402. Mapping application 400 may then inform user 170 travelling along the road 414 that she/he is located outside of the area 402.

Having described, with reference to FIG. 1 to FIG. 5, some non-limiting example instances of the problem of determining whether a point lies within a polygon in a multidimensional space, we shall now describe a general solution to this problem with reference to FIG. 6 to FIG. 10. More specifically, in FIG. 6 to FIG. 10, regions each encompassing a respective portion of a first polygon 600 representing a closed curve are generated. The regions are generated by identifying regions each encompassing a respective portion of the first polygon 600 as part of a process of approximating the first polygon 600 according to an implementation of the well-known Ramer-Douglas-Peucker (RDP) algorithm.

Figure 6:
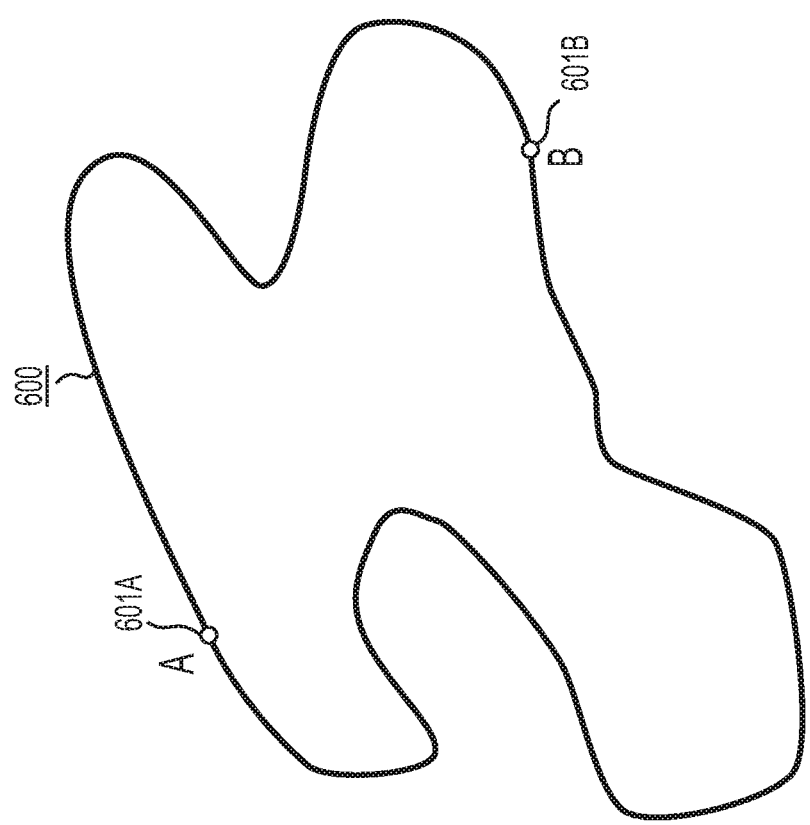
FIGS. 6 to 8 are diagrams illustrating a process of identifying regions of the multidimensional space each encompassing a respective portion of polygon coordinates, the regions approximating the first polygon, the process being implemented in accordance with non-limiting embodiments of the present technology.

FIG. 6 shows a two-dimensional closed curve represented by a polygon 600. The closed curve loops from a point 601A to a point 601B and back to point 601A.

Figure 7:
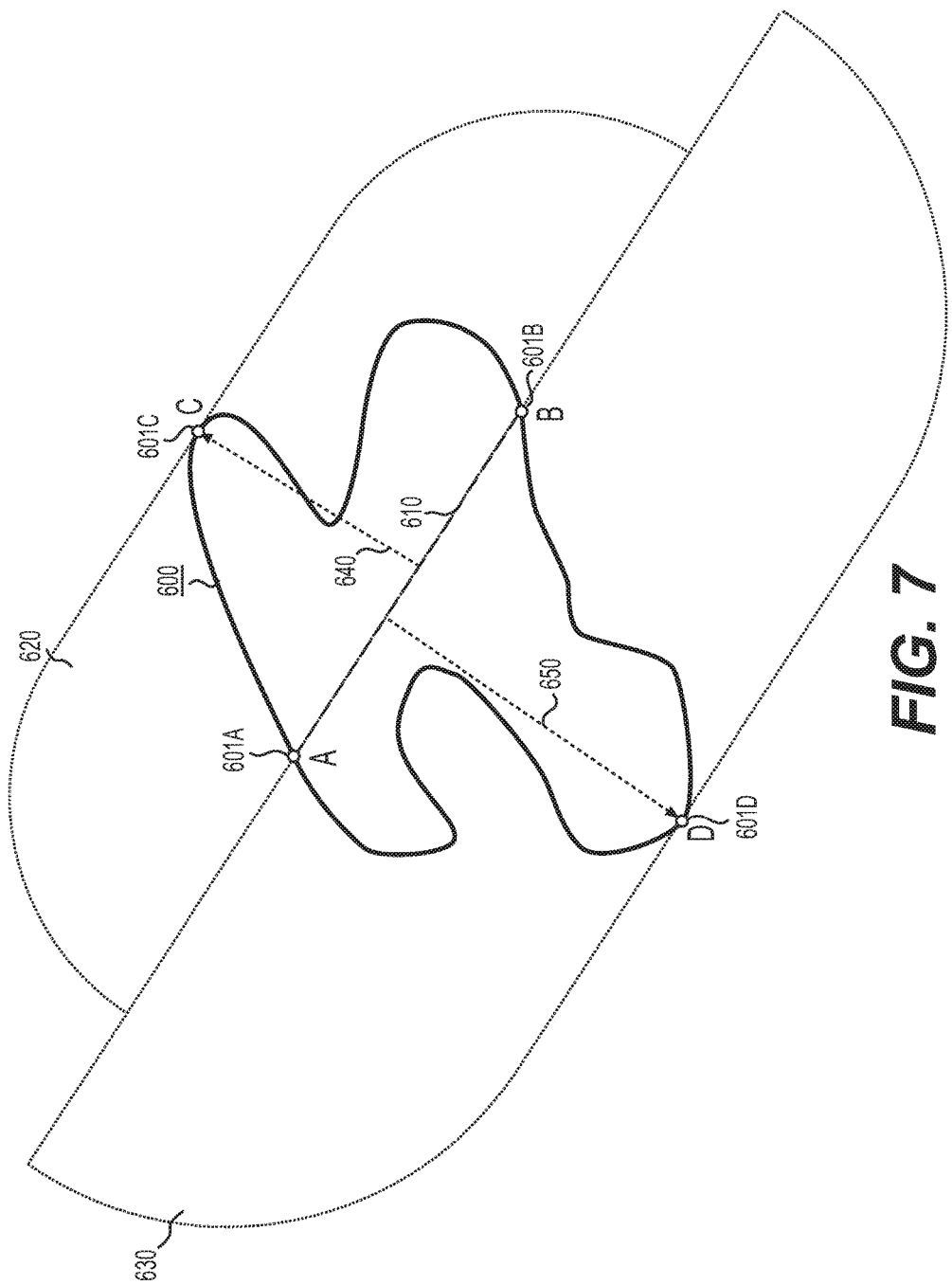

In FIG. 7, a first approximation curve consisting of a single line segment 610 serves as a first approximation of the first polygon 600. According to this implementation of the present technology, each line segment of the first approximation curve (e.g. line segment 610) is encompassed by an identified region being an area consisting of two component areas each defined by a respective boundary distance to a most distant point away from a respective side of the line segment.

For example, as presented in FIG. 7, an output of a first iteration of the RDP algorithm performed on the first polygon 600 is shown. A region consisting of the component areas 620 and 630 encompasses line segment 610 of the first approximation curve. A most distant point 601C from a first side of the line segment 610 on the first polygon 600 between point 601A and point 601B defines a first boundary distance of the component region 620, and a most distant point 601D from a second side of the line segment 610 on the first polygon 600 between point 601B and point 601A defines a boundary distance of the component region 630.

Thus, in the implementation of the present technology shown in FIG. 7, each region is defined by two boundary distances, one in each opposing direction away from a respective side of a line segment of the first approximation curve. As those skilled in the art will understand, this type of region (area in the two-dimensional case) is merely one variation and other types of regions may also be used in various implementation of the present technology.

Figure 8:
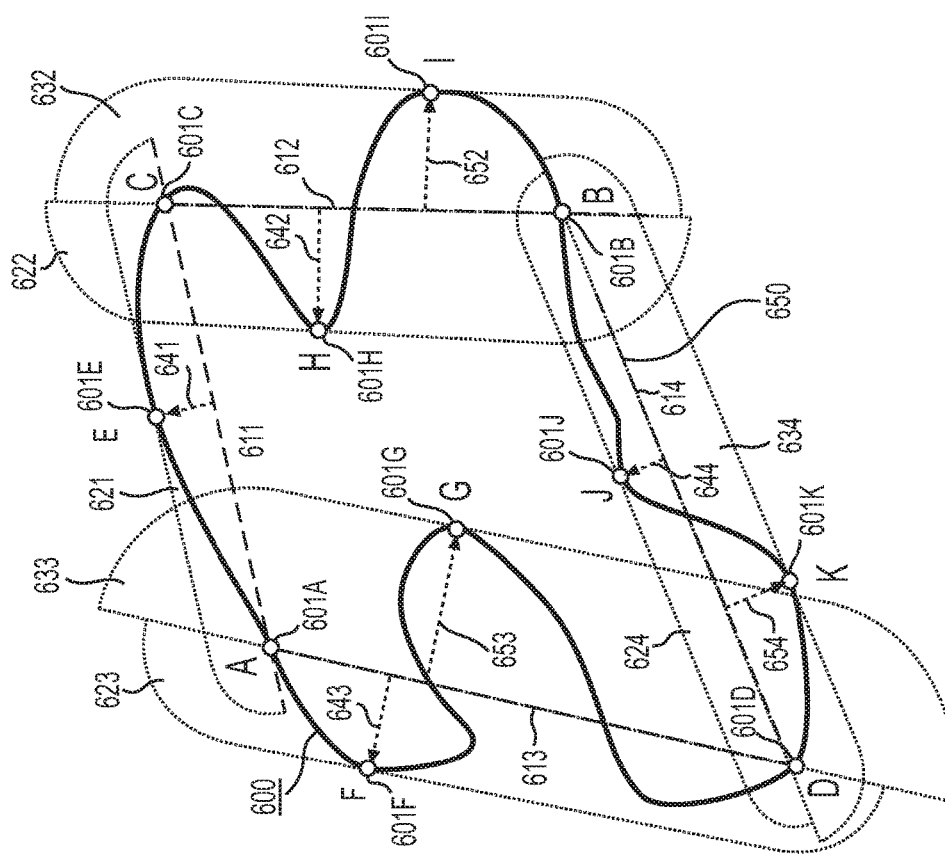

Turning now to FIG. 8, the single line segment 610 of the first approximation curve of FIG. 7 has been replaced by four line segments 611 to 614 of a second approximation curve. The four line segments 611 to 614 define a second polygon 650 used in generating regions approximating the first polygon 600 with a determined level of accuracy. The line segment 611 connects the point 601A to the point 601C which had been identified as the most distant point from a first side of the line segment 610. The line segment 612 connects the point 601C to the point 601B. The line segment 613 connects the point 601A to the point 601D which had been identified as the most distant point from a second side of the line segment 610. The line segment 614 connects the point 601D to the point 601B.

As in FIG. 7, each one of the line segments 611 to 614 is encompassed by a respective region defined as an area consisting of two component areas, each of the component areas being defined in turn by a respective boundary distance of a most distant point on a respective portion of the first polygon 600 away from one side of the corresponding line segment (one of 611 to 614) approximating that portion of the first polygon 600.

Thus, line segment 612 is encompassed by a region consisting of an area 622 defined by a first boundary distance from line segment 612 to a most distant point 601H away from a first side of line segment 612 and an area 632 defined by a second boundary distance from the line segment 612 to a most distant point 601I away from a second side of line segment 612. Line segment 613 is encompassed by a region consisting of an area 623 defined by a first boundary distance from line segment 613 to a most distant point 601F away from a first side of line segment 613 and an area 633 defined by a second boundary distance from the line segment 613 to a most distant point 601G away from a second side of line segment 613. Line segment 614 is encompassed by a region consisting of an area 624 defined by a first boundary distance from line segment 614 to a most distant point 601J away from a first side of line segment 614 and an area 634 defined by a second boundary distance from the line segment 614 to a most distant point 601K away from a second side of line segment 614.

The region encompassing line segment 611 presents a special case wherein the boundary distance away from one side of the line segment 611 is zero because no portion of the first polygon 600 between point 601A and point 601C lies to that side of the line segment 611. As such the region encompassing line segment 611 is a region consisting of a first component area 621 defined by a first boundary distance from line segment 611 to a most distant point 601E away from a first side of line segment 611 and a null area corresponding to the zero boundary distance of the second side of line segment 611.

According to the present example implementation of the RDP algorithm, generation of regions approximating the first polygon 600 may halt after just one iteration because it may be determined that none of the regions in the set of regions shown in FIG. 8 has a greatest boundary distance (the greater of the first boundary distance and the second boundary distance) that is greater than a threshold value. The threshold value established the level of accuracy of the approximation of the first polygon 600 by the regions. The "final" version of the regions may therefore be that consisting of a first region consisting of the component area 621, a second region consisting of the component areas 622 and 632, a third region consisting of the component areas 624 and 634 and a fourth region consisting of the component areas 623 and 633, as shown in FIG. 8. As it should be apparent to those skilled in the art, subsequent iterations of the RDP algorithm may be performed on the "final" version of the regions without departing from the scope of the present technology. Such subsequent iterations may result in the generation of another version of the regions having a number of regions greater than the number of regions of the "final" version of the regions thereby resulting in a better level of accuracy of the approximation of the first polygon 600 than the level of accuracy of the approximation of the "final" version of the regions. The level of accuracy may therefore be related to the number of iterations of the RDP algorithm.

Figure 9:
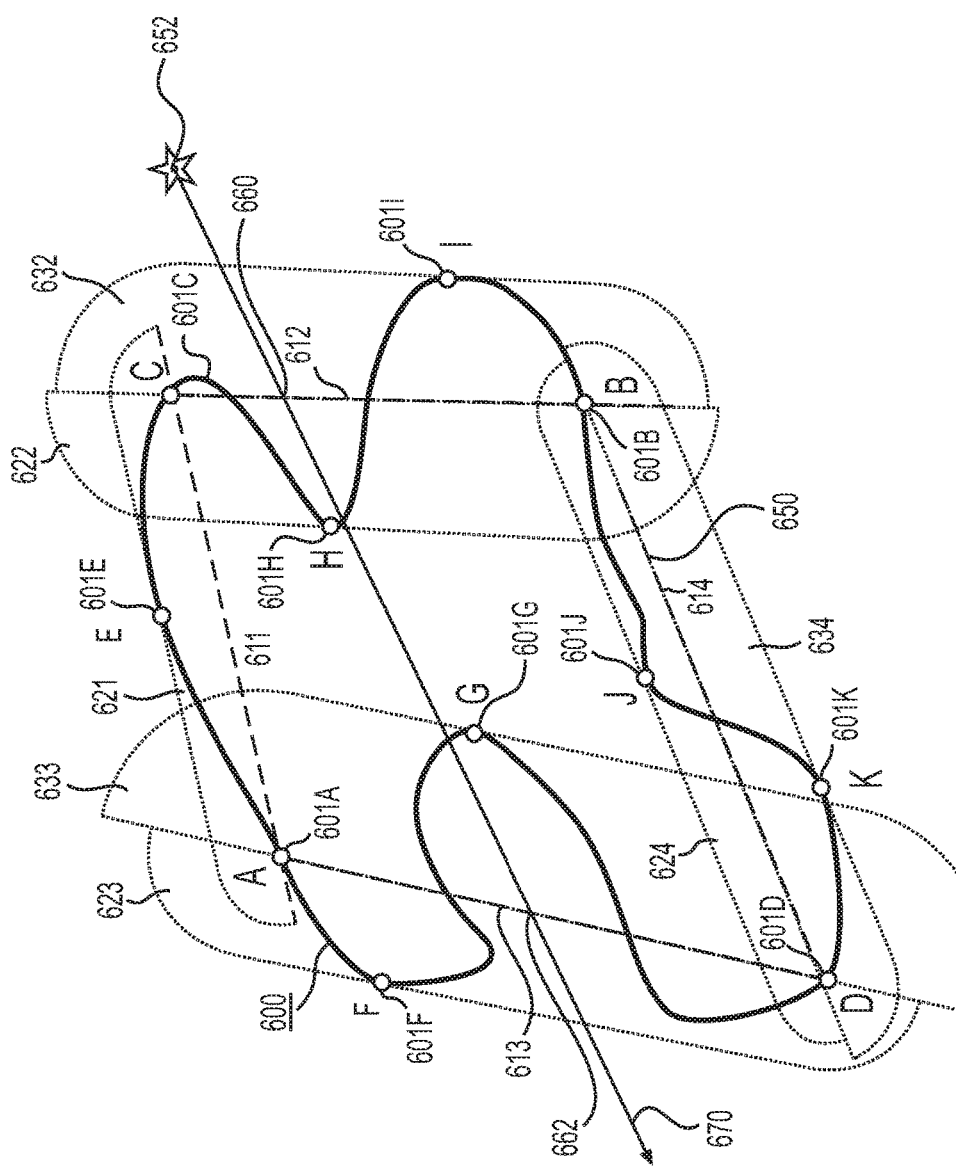
FIGS. 9 and 10 are diagrams illustrating a process of analysing region coordinates and point coordinates to generate an indication that a point lies within a polygon or that a point does not lie within the polygon, the process being implemented in accordance with non-limiting embodiments of the present technology.

Turning to FIG. 9, the first polygon 600 is shown again as it appeared in FIG. 8, with the "final" version of the regions being an approximation of the first polygon 600 comprising the first region consisting of the component area 621, the second region consisting of the component areas 622 and 632, the third region consisting of the component areas 624 and 634 and the fourth region consisting of the component areas 623 and 633. In addition, a hit point 652 is positioned outside the closed curved defined by the first polygon 600.

Hit point 652 represents a general case of a point for which determination as to whether the hit point 652 lies within the first polygon 600 is to be made. In more specific applications such as the mapping application 400 (FIG. 3 to FIG. 5), the hit point 652 and the first polygon 600 may be, as non-limiting examples, the GPS position 416 and a closed curve representing boundaries of the area 402 respectively.

According to implementations of the present technology, a determination of whether the hit point 652 lies within the first polygon 600 may be made by analyzing region coordinates of regions each encompassing a respective portion of the first polygon 600 in the multidimensional space and hit point coordinates defining a position of the hit point 652 in the multidimensional space. The analysis of the region coordinates and hit point coordinates allows determining whether the hit point 652 lies within an area bounded by the regions approximating the first polygon 600 and, hence, determining whether the hit point 652 lies within the first polygon 600.

According to implementations of the present technology, the analysis of the region coordinates and hit point coordinates comprises executing the well-known Ray Casting (RC) algorithm. According to the RC algorithm, determining whether the hit point 652 lies within the area bounded by the regions approximating the first polygon 600 may be conducted by determining a number of times a ray 670 projecting from the hit point 652 towards any direction intersects any of the regions approximating the first polygon 600. In the exemplary embodiment depicted at FIG. 9, the ray 670 projects towards the second region consisting of the component areas 622 and 632 and intersects the second region and the fourth region consisting of the component areas 623 and 633. By intersecting the second and fourth regions, the ray 670 intersects the second polygon 650 at intersection points 660 and 662. In other words, the number of times the ray 670 intersects the regions approximating the first polygon 600 is two. Still in accordance with the RC algorithm, as the number of times the ray 670 intersects the regions approximating the first polygon 600 is an even number, determination may be made that the hit point 652 does not lie within the area bounded by the regions approximating the first polygon 600 and that, therefore, the hit point 652 does not lie within the first polygon 600. As it will be apparent to those skilled in the art, providing that a ray projecting from the hit point 652 be in any other directions than the direction of the ray 670, the number of times the ray crosses the regions approximating the first polygon 600 would remain an even number. In the exemplary embodiment depicted at FIG. 9, the even number may be zero or two.

Figure 10:
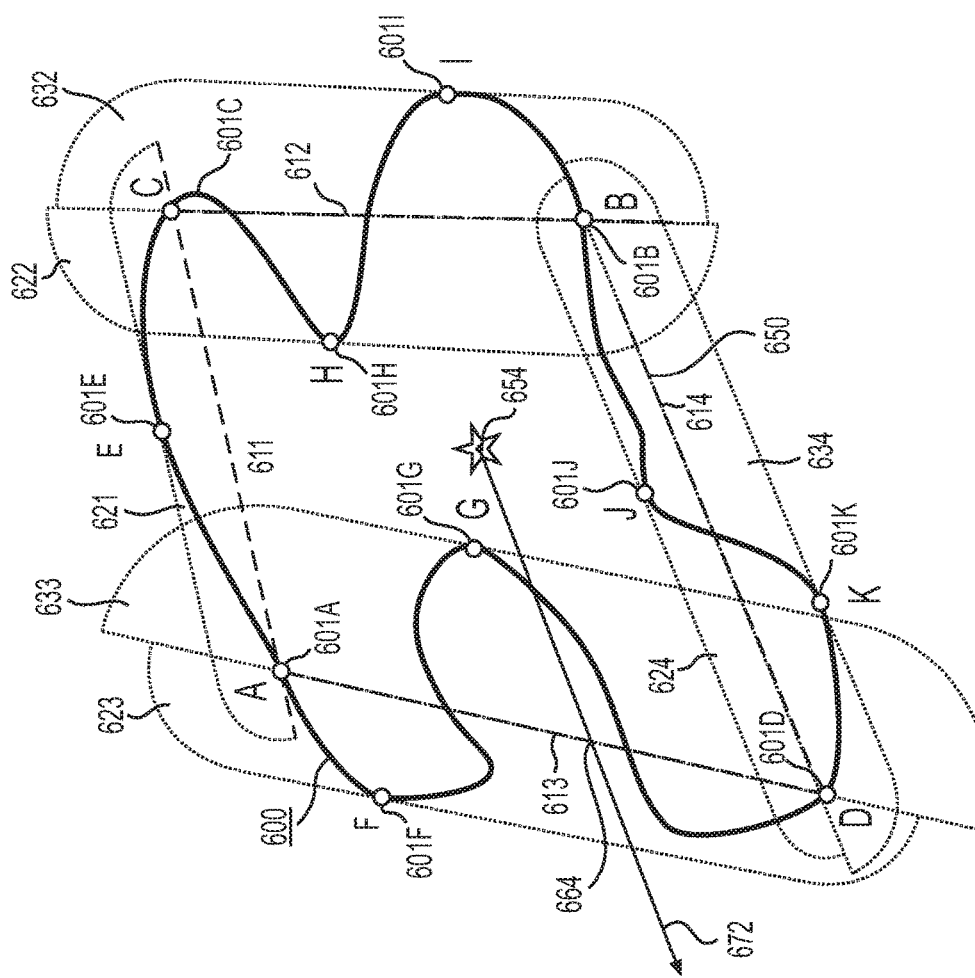

Turning now to FIG. 10, the first polygon 600 is shown again as it appeared in FIG. 8, with the "final" version of the regions being an approximation of the first polygon 600 comprising the first region consisting of the component area 621, the second region consisting of the component areas 622 and 632, the third region consisting of the component areas 624 and 634 and the fourth region consisting of the component areas 623 and 633. In addition, a hit point 654 is positioned inside the closed curved defined by the first polygon 600. Similarly to the hit point 652, the hit point 654 represents a general case of a point for which determination as to whether the hit point 654 lies within the first polygon 600 is to be made.

In the exemplary embodiment depicted at FIG. 10, the ray 672 projects towards the fourth region consisting of the component areas 623 and 633 and intersects the fourth region. By intersecting the fourth region, the ray 672 intersects the second polygon 650 at intersection point 664. In other words, the number of times the ray 672 intersects the regions approximating the first polygon 600 is one. Still in accordance with the RC algorithm, as the number of times the ray 672 intersects the regions approximating the first polygon 600 is an odd number, determination may be made that the hit point 654 lies within the area bounded by the regions approximating the first polygon 600 and that, therefore, the hit point 654 lies within the first polygon 600. As it will be apparent to those skilled in the art, providing that a ray projecting from the hit point 654 be in any other directions than the direction of the ray 672, the number of times the ray crosses the regions approximating the first polygon 600 would remain an odd number. In the exemplary embodiment depicted at FIG. 10, the even number is one.

Figure 11:
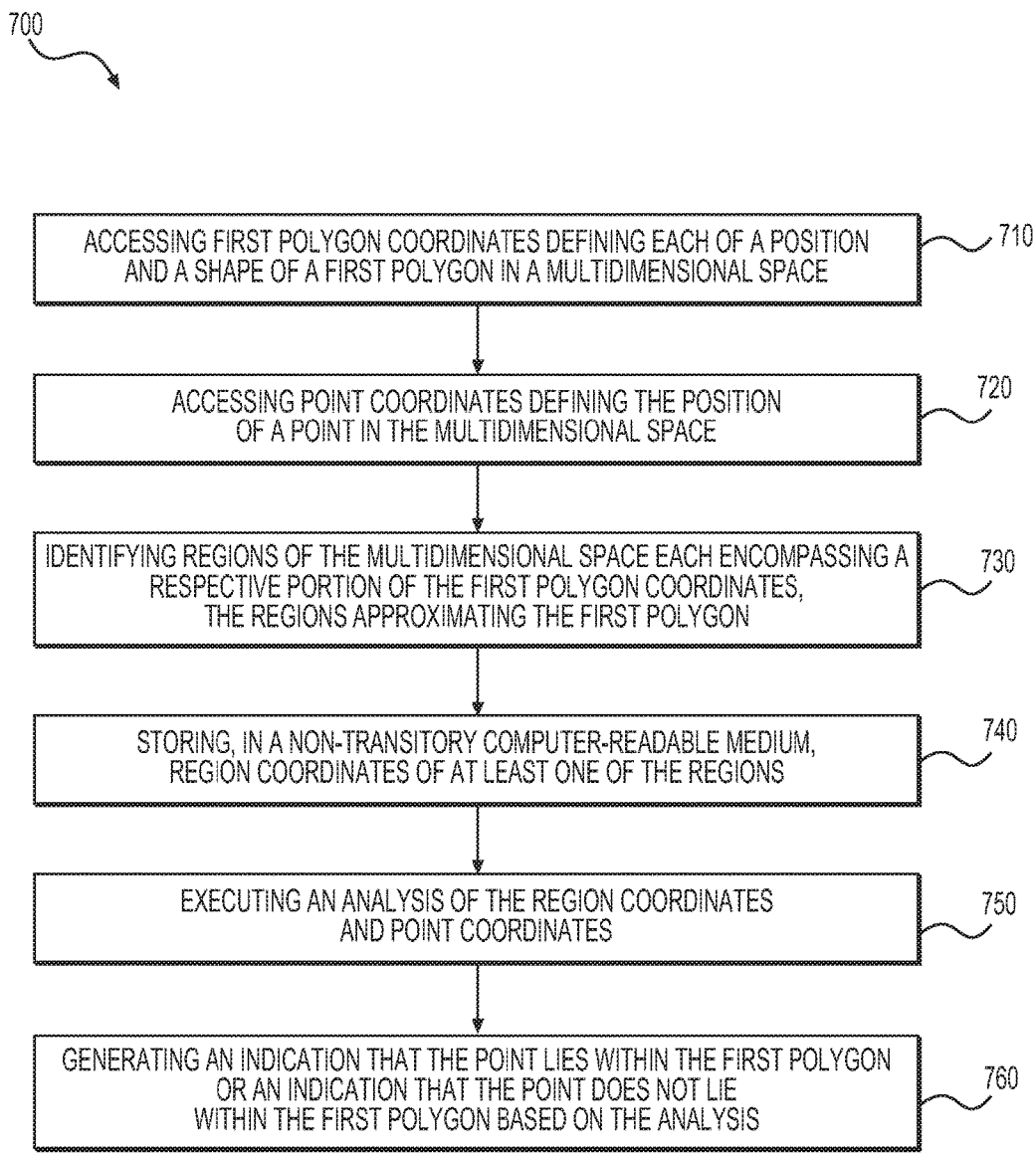
FIGS. 11 and 12 are flowcharts illustrating the respective steps of two methods implementing embodiments of the present technology.

With reference now to FIG. 11, a flowchart corresponding to an exemplary method implementation of the present technology is shown. More specifically, FIG. 11 shows a computer-implemented method 700 for determining whether a point lies within a polygon in a multidimensional space, the method executable by a processor of an electronic device. Method 700 may be carried out, for example, in the context of the computer system 100 of FIG. 1 or in the context of the smartphone 310 of FIG. 2 by a processor 110 executing program instructions having been loaded into the random access memory 130 from the solid-state drive 120.

At step 710, first polygon coordinates defining each of a position and a shape of the first polygon in the multidimensional space are accessed. Referring to the non-limiting example of the mapping application 400, the appreciation of the polygon coordinates may refer to receiving coordinates of the boundaries of the area 402. At step 720, the point coordinates defining the position of the point in the multidimensional space are accessed. Referring to the non-limiting example of the mapping application 400, the appreciation of the point coordinates may refer to receiving coordinates of the GPS position 416.

At step 730, regions of the multidimensional space each encompassing a respective portion of the first polygon coordinates are identified. The regions approximate the first polygon. In some implementations, identifying the regions of the multidimensional space each encompassing a respective portion of the first polygon may comprise generating a second polygon approximating the first polygon. Identifying the regions may also include identifying a first set of the regions while generating a first version of the second polygon, the first version of the second polygon being a first polygonal chain. Identifying the regions may also further include identifying a second set of the regions while generating a second version of the second polygon, the second version of the second polygon being a second polygonal chain having more line segments than the first polygonal chain. For example, identifying the first set of the regions may comprise determining that at least one member of the first set of the regions has a boundary distance greater than a threshold value, suggesting a need to generate a better approximation of the first set of the regions. It may then be required to identify the second set of the regions which may comprise determining that no member of the second set of the regions has a boundary distance greater than the threshold value, suggesting that the second set of the regions is sufficiently accurate.

In some cases, however, a third, fourth, fifth, etc., set of the regions may be generated, until no members of the set of regions has a boundary distance greater than the threshold value. For example, the regions approximating the first polygon may be generated recursively or iteratively by executing a Ramer-Douglas-Peucker (RDP) algorithm such as that described with reference to FIGS. 6 to 8.

In some examples, each one of the regions may consist of all points no further than a boundary distance from a line approximating the respective portion of the first polygon of the one of the regions, the boundary distance being a shortest distance from the line to a point most distant from the line on the respective portion of the first polygon.

In some other examples, the multidimensional space has two dimensions and each one of the regions may be a respective area of the multidimensional space consisting of all points no further than a first boundary distance away from a first side of a line approximating the respective portion of the first polygon of the one of the regions, the first boundary distance being a shortest distance away from the first side of the line to a point most distant from the first side of the line on the respective portion of the first polygon. Each one of the regions may also be respective area of the multidimensional space consisting of all points no further than a second boundary distance away from a second side of the line, the second boundary distance being a shortest distance away from the second side of the line to a point most distant from the second side of the line on the respective portion of the first polygon.

At step 740, region coordinates of at least one of the regions are stored in a non-transitory computer-readable medium (examples of which include the random access memory 130 and the solid-state drive 120 of computer system 100).

At step 750, an analysis of the region coordinates and point coordinates defining the position of the point in the multidimensional space may then be executed. This analysis may be performed by the same processor 110 of the same electronic device (e.g. computer system 100 or smartphone 310) that identified the regions encompassing respective portions of the first polygon coordinates, or it may be performed by an altogether different processor of a different electronic device having obtained the region coordinates of the regions from the processor 110 of the electronic device, for example via a communications network (e.g. communications network 301).

For example, the analysis may include evaluating whether the point lies or does not lie within the first polygon. In an example, executing the analysis may include executing a Ray Casting algorithm. In another example, the analysis may include determining a number of times a ray projecting from the point towards any direction intersects any of the plurality of regions. The analysis may further include determining that if the number of times the ray projecting from the point towards any direction intersects any of the plurality of regions is an odd number then an indication that the point lies within the first polygon may be generated. The analysis may also further include determining that if the number of times the ray projecting from the point towards any direction intersects any of the plurality of regions is an even number then an indication that the point does not lie within the first polygon may be generated.

At step 760, either an indication that the point lies within the first polygon or an indication that the point does not lie within the first polygon is provided to a user of the electronic device based on the analysis. For example, with reference to the mapping application 400, an indication that the GPS position 416 does not lie within the area 402 may be provided to the user 170.

Figure 12:
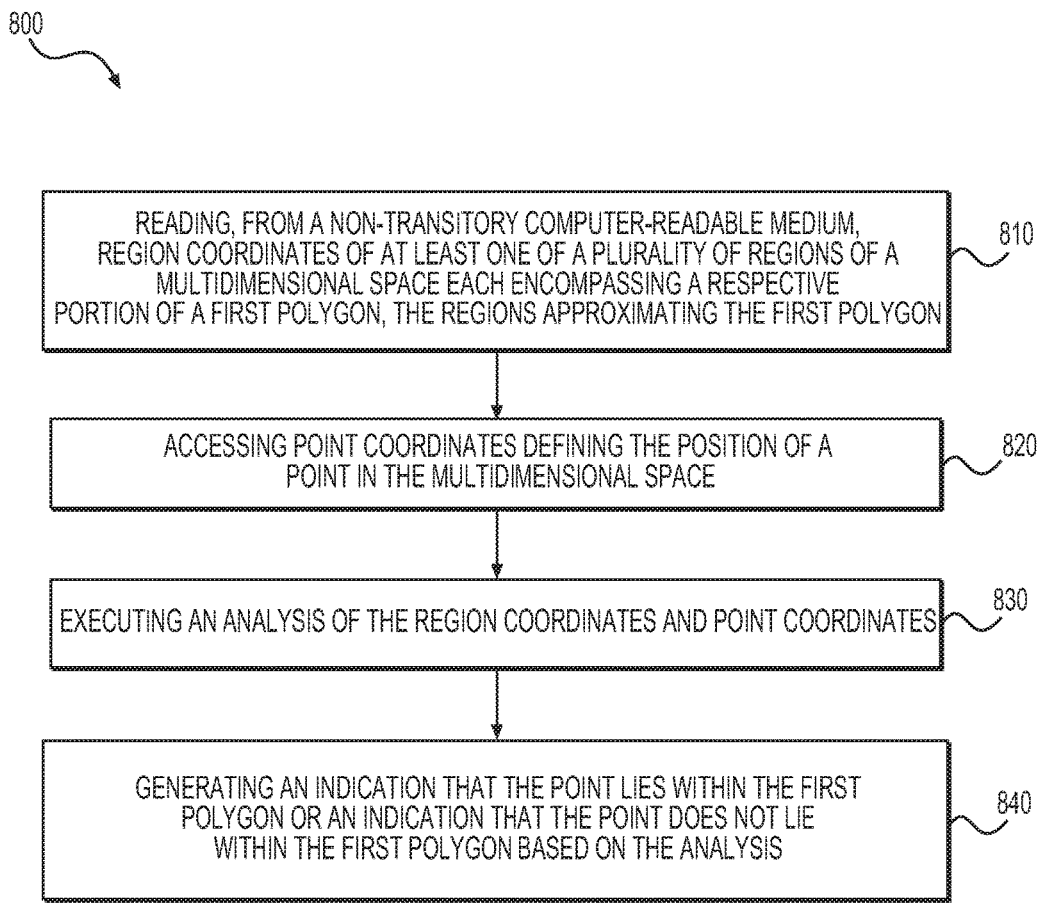

In other cases, as described above, the analysis may not be performed as part of the method 700, but as an independent computer-implemented method 800 for determining whether a point lies within a polygon in a multidimensional space, as depicted in FIG. 12. For example, method 800 may be carried out in the context of another computer system 100 having region coordinates stored in a non-transitory computer-readable medium such as a solid state drive 120 or a random access memory 130.

At step 810, region coordinates of at least one of a plurality of regions of the multidimensional space each encompassing a respective portion of the first polygon, the regions approximating the first polygon, are read from the non-transitory computer-readable medium.

At step 820, as at step 720 above, point coordinates defining a position of the point in the multidimensional space are accessed.

At step 830, as at step 750 above, the analysis of the region coordinates and the point coordinates is executed.

At step 840, as at step 760 above, either an indication that the point lies within the first polygon or an indication that the point does not lie within the first polygon is provided to a user of the electronic device based on the analysis.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for determining whether a point lies within a first polygon in a multidimensional space, the method executable by a processor of a device, the point corresponding to a location of the device, the first polygon bounding an area on a map displayable on the device, the method comprising:

reading, from a non-transitory computer-readable medium, region coordinates of at least one of a plurality of regions of the multidimensional space each encompassing a respective portion of first polygon coordinates, the first polygon coordinates defining first polygon boundaries of the first polygon, each region comprising a respective region boundary such that each region boundary intersects at least once the first polygon boundaries of the first polygon, the regions approximating the first polygon;

accessing point coordinates defining a position of the point in the multidimensional space;

executing an analysis of the region coordinates and the point coordinates to determine a number of times a ray projecting from the point towards any direction intersects the plurality of regions;

generating, based on the number of times the ray projecting from the point towards any direction intersects any of the plurality of regions, one of an indication that the point lies within the first polygon and an indication that the point does not lie within the first polygon;

using, by the device, the generated indication for displaying the map to a user of the device;

wherein the multidimensional space has only two dimensions, and each one of the regions is a respective area of the multidimensional space consisting of:

all points no further than a first boundary distance away from a first side of a line approximating the respective portion of the first polygon of the one of the regions, the first boundary distance being a shortest distance away from the first side of the line to a point most distant from the first side of the line on the respective portion of the first polygon; and all points no further than a second boundary distance away from a second side of the line, the second boundary distance being a shortest distance away from the second side of the line to a point most distant from the second side of the line on the respective portion of the first polygon.

2. The method of claim 1, wherein executing the analysis of the point coordinates and the region coordinates comprises executing a Ray Casting algorithm.

3. The method of claim 1, further comprising generating the indication that the point lies within the first polygon if the number of times the ray projecting from the point towards any direction intersects any of the plurality of regions is an odd number.

4. The method of claim 1, further comprising generating the indication that the point does not lie within the first polygon if the number of times the ray projecting from the point towards any direction intersects any of the plurality of regions is an even number.

5. A computer-implemented method for determining whether a point lies within a first polygon in a multidimensional space, the method executable by a processor of a device, the point corresponding to a location of the device, the first polygon bounding an area on a map displayable on the device, the method comprising:

accessing first polygon coordinates defining each of a position and a shape of the first polygon in the multidimensional space, the first polygon coordinates defining first polygon boundaries of the first polygon;

accessing point coordinates defining the position of the point in the multidimensional space;

identifying regions of the multidimensional space each encompassing a respective portion of the first polygon coordinates, each region comprising a respective region boundary such that each region boundary intersects at least once the first polygon boundaries of the first polygon, the regions approximating the first polygon;

storing, in a non-transitory computer-readable medium, region coordinates of at least one of the regions;

whereby an analysis of the region coordinates and point coordinates is executable to generate one of an indication that the point lies within the first polygon and an indication that the point does not lie within the first polygon;

wherein the multidimensional space has only two dimensions, and each one of the regions is a respective area of the multidimensional space consisting of:

all points no further than a first boundary distance away from a first side of a line approximating the respective portion of the first polygon of the one of the regions, the first boundary distance being a shortest distance away from the first side of the line to a point most distant from the first side of the line on the respective portion of the first polygon; and all points no further than a second boundary distance away from a second side of the line, the second boundary distance being a shortest distance away from the second side of the line to a point most distant from the second side of the line on the respective portion of the first polygon.

6. The method of claim 5, wherein identifying the regions of the multidimensional space each encompassing a respective portion of the first polygon approximating the first polygon comprises:

generating a second polygon approximating the first polygon;

identifying a first set of the regions while generating a first version of the second polygon, the first version of the second polygon being a first polygonal chain; and identifying a second set of the regions while generating a second version of the second polygon, the second version of the second polygon being a second polygonal chain having more line segments than the first polygonal chain.

7. The method of claim 6, wherein:

identifying the first set of the regions comprises determining that at least one member of the first set of the regions has a boundary distance greater than a threshold value; and identifying the second set of the regions comprises determining that no member of the second set of the regions has a boundary distance greater than the threshold value.

8. The method of claim 6, wherein identifying the regions approximating the first polygon comprises executing a Ramer-Douglas-Peucker algorithm.

9. The method of claim 5, further comprising:

executing the analysis of the region coordinates and the point coordinates; and generating, one of an indication that the point lies within the first polygon and an indication that the point does not lie within the first polygon based on the analysis of the region coordinates and point coordinates.

10. A computer-implemented method for determining whether a point lies within a first polygon in a multidimensional space, the method executable by a processor of a device, the point corresponding to a location of the device, the first polygon bounding an area on a map displayable on the device, the method comprising:

reading, from a non-transitory computer-readable medium, region coordinates of at least one of a plurality of regions of the multidimensional space each encompassing a respective portion of first polygon coordinates, the first polygon coordinates defining first polygon boundaries of the first polygon, each region comprising a respective region boundary such that each region boundary intersects at least once the first polygon boundaries of the first polygon, the regions approximating the first polygon;

accessing point coordinates defining a position of the point in the multidimensional space;

executing an analysis of the region coordinates and the point coordinates;

generating one of an indication that the point lies within the first polygon and an indication that the point does not lie within the first polygon based on the analysis of the point coordinates and the region coordinates;

wherein the multidimensional space has only two dimensions, and each one of the regions is a respective area of the multidimensional space consisting of:

all points no further than a first boundary distance away from a first side of a line approximating the respective portion of the first polygon of the one of the regions, the first boundary distance being a shortest distance away from the first side of the line to a point most distant from the first side of the line on the respective portion of the first polygon; and all points no further than a second boundary distance away from a second side of the line, the second boundary distance being a shortest distance away from the second side of the line to a point most distant from the second side of the line on the respective portion of the first polygon.

11. The method of claim 10, executing the analysis of the region coordinates and the point coordinates comprises executing a Ray Casting algorithm.

12. The method of claim 10, wherein generating the one of the indication that the point lies within the first polygon and the indication that the point does not lie within the first polygon based on the analysis of the point coordinates and the region coordinates is after determining a number of times a ray projecting from the point towards any direction intersects any of the plurality of regions.

13. The method of claim 12, further comprising generating the indication that the point lies within the first polygon after determining that the number of times the ray projecting from the point towards any direction intersects any of the plurality of regions is an odd number.

14. The method of claim 12, further comprising generating the indication that the point does not lie within the first polygon after determining that the number of times the ray projecting from the point towards any direction intersects any of the plurality of regions is an even number.

* * * * *